United States Patent [19]
Gupta

[11] Patent Number: 5,905,726
[45] Date of Patent: May 18, 1999

[54] BROADBAND COMMUNICATION SYSTEM HAVING A VIRTUAL CIRCUIT SPACE SWITCH

[75] Inventor: Dev V. Gupta, Flemington, N.J.

[73] Assignee: Cisco Technology, Inc., San Jose, Calif.

[21] Appl. No.: 08/651,825

[22] Filed: May 21, 1996

[51] Int. Cl.$^6$ .............................. H04L 12/18; H04L 12/56
[52] U.S. Cl. ........................ 370/390; 370/423; 370/427; 348/7; 455/4.2
[58] Field of Search ................................... 370/390, 395, 370/398, 399, 401, 419, 421, 422, 423, 427; 544/3.1, 4.1, 4.2; 348/6, 7, 16; 375/298

[56] References Cited

U.S. PATENT DOCUMENTS

| | | | |
|---|---|---|---|
| 5,150,247 | 9/1992 | Sharpe et al. | 359/135 |
| 5,272,697 | 12/1993 | Fraser et al. | 370/61 |
| 5,402,415 | 3/1995 | Turner | 370/60 |
| 5,457,560 | 10/1995 | Sharpe et al. | 359/137 |
| 5,487,063 | 1/1996 | Kakuma et al. | 370/56 |
| 5,506,714 | 4/1996 | Nishio | 359/139 |
| 5,515,370 | 5/1996 | Rau | 370/60.1 |
| 5,517,617 | 5/1996 | Sathaye et al. | 395/200.1 |
| 5,541,917 | 7/1996 | Farris | 370/352 |
| 5,577,038 | 11/1996 | Miyahara | 370/352 |
| 5,583,561 | 12/1996 | Baker et al. | 348/7 |
| 5,671,217 | 9/1997 | Adams et al. | 370/233 |

FOREIGN PATENT DOCUMENTS

| | | |
|---|---|---|
| 0 701 384 A2 | 3/1996 | European Pat. Off. |
| 0 700 205 A2 | 6/1996 | European Pat. Off. |

OTHER PUBLICATIONS

Philmon, E., "A Tale of Two Systems," *Telephony*, pp. 36, 37, 40 and 44 (1996, Apr. 29).

*Primary Examiner*—Hassan Kizou
*Attorney, Agent, or Firm*—Hamilton, Brook, Smith & Reynolds, P.C.

[57] ABSTRACT

A communication system is described which enables efficient delivery of asymmetrical bandwidth signals over a communication network. The system includes a virtual circuit switch having a space switch coupled thereto for distributing downstream signals from a backbone network to subscribers in a cost effective manner.

18 Claims, 6 Drawing Sheets

BROADBAND COMMUNICATION SYSTEM HAVING A VIRTUAL CIRCUIT SPACE SWITCH

BACKGROUND OF THE INVENTION

Multimedia communication requires the simultaneous delivery of time synchronized voice, video and data signals. A Multimedia Access Network has the task of delivering such signals to and from a switching entity and the multiple subscriber premises which it services. The switching entity acts as a gateway to the rest of the world and allows the subscribers access to the multiple backbone networks terminating on it. For this reason the switching entity can be called an Access Gateway (AGW). At the subscriber's premises, a Residential Gateway (RGW) terminates the multimedia signals from the switching entity AGW and regenerates the communication services being consumed at the premises.

U.S. patent application Ser. No. 08/269,370 filed Jun. 30, 1994, now U.S. Pat. No. 5,555,244 and entitled "Scalable Multimedia Network" (incorporated herein in its entirety by reference), is concerned with many of the problems associated with the suitability of multimedia communication services on an AGW.

The AGW must communicate with the RGW over some type of physical media. This media may be wireless or wireline. Multimedia wireless communication is a topic undergoing much research and is an emerging technology. The most common wireline media currently deployed uses Hybrid Fiber Coax (HFC) drops for broadcast video services and twisted pair copper drops for Plain Old Telephone Service (POTS).

HFC drop networks are being deployed by CATV operators and have an advantage in that they are based on broadband physical media. However, HFC networks are deployed as shared media whereby hundreds (even thousands) of subscribers tap onto one run of cable. Such an architecture is highly cost-effective for downstream broadcast services, but creates a difficult multiple access problem when the RGWs at the subscriber try to communicate upstream with the AGW.

Current, or second generation, so-called Fiber-To-The-Curb (FTTC) access networks are being deployed by access network providers to deliver broadband services. In such FTTC networks, optical fibers connect the AGW to multiple Optical Network Units (ONUs) located in the outside plant. From each ONU, coaxial cable and pre-existing copper pairs are used to provide POTS and broadband services to the subscriber. Such ONUs provide broadband distribution, but because they are essentially multiplexing entities and not switches, they typically can serve only a limited number (e.g., 16 to 32) of subscribers and therefore, are difficult to justify economically.

Virtual circuit switches, generally ATM-based, are being deployed for the AGW function. However, the per port cost of a virtual circuit switch today does not justify dedicating a port to each subscriber, and therefore, virtual circuit switching functionality is not found typically located in the access network near subscribers.

Multimedia services tend to be asymmetrical, i.e., the "downstream" services to subscribers require greater bandwidth than the "upstream" services from subscribers. Because the downstream services also tend to be broadcast or multicast, providing a port per subscriber on a virtual circuit switch is expensive and wasteful of scarce network resources.

A need exists for a FTTC architecture that can allow access network providers to offer broadband services to a large number of users economically.

SUMMARY OF THE INVENTION

The above problems are obviated by a system which takes advantage of the asymmetrical nature of multimedia services to provide a cost effective FTTC architecture. The invention reduces the number of interfaces needed on a virtual circuit switch to support a large number of subscribers.

Accordingly, apparatus for coupling video signals from a network to subscribers comprises a virtual circuit switch having first input ports and first output ports. The virtual circuit switch connects signals carried in virtual circuits received on the first input ports to any of the first output ports. The apparatus includes a space switch having second input ports and second output ports. The second input ports are coupled to respective first output ports. The space switch includes a switching matrix for connecting any second input port to one or more second output ports.

In a preferred embodiment, a communication system for transmitting video signals to subscribers comprises a switch coupled to a source of video signals. The switch includes a first interface unit coupled to the source for coupling the video signals onto a digital communication bus. A transmitter coupled to the digital communication bus converts the video signals into amplitude modulated (AM) signals and transmits the AM signals onto an analog communication bus. Second interface units coupled to the analog bus are operable to transmit selected AM signals requested by associated subscribers.

DESCRIPTION OF THE PREFERRED EMBODIMENTS OF THE INVENTION

Figure 1:
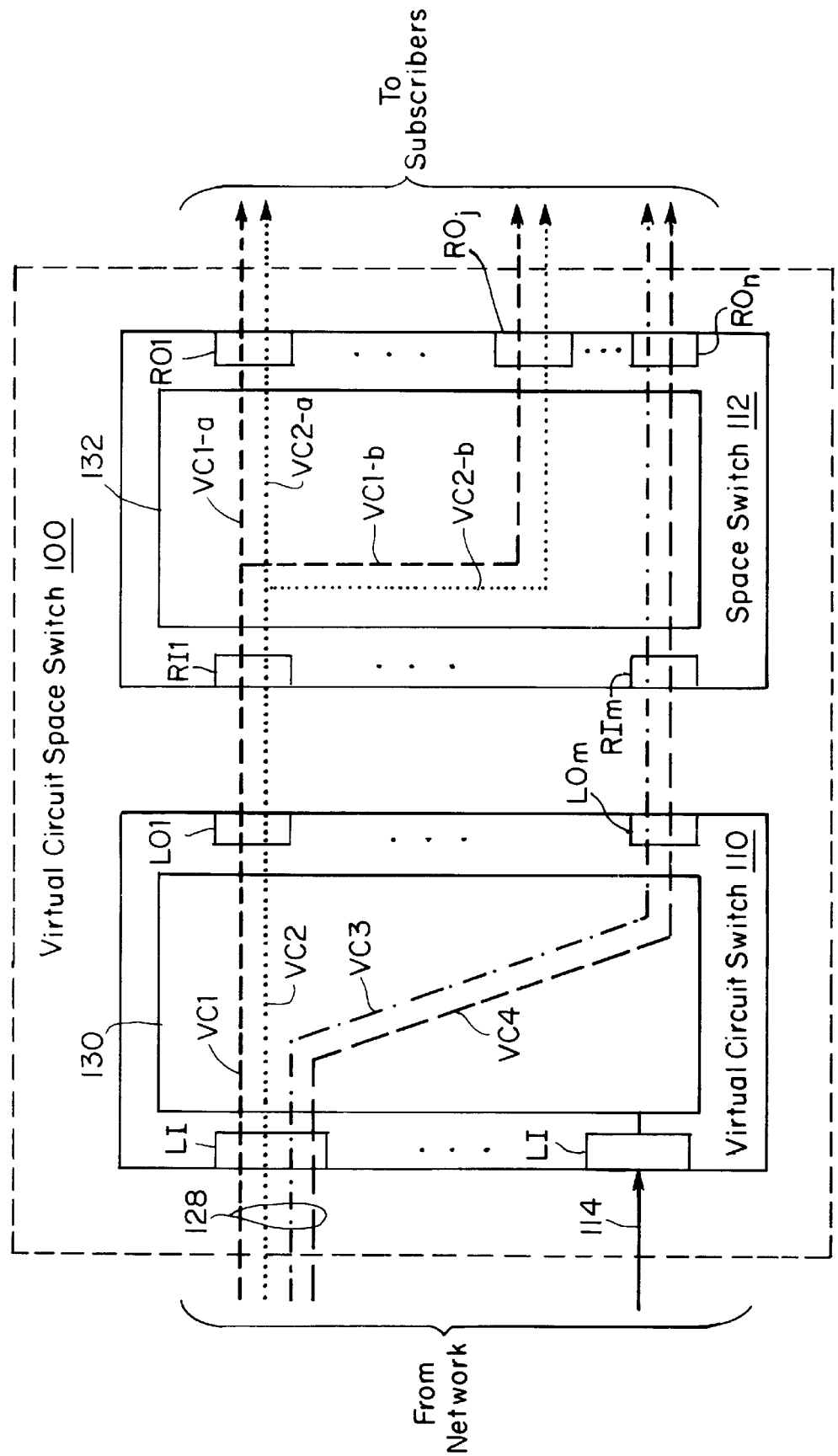
FIG. 1 is a schematic block diagram of a virtual circuit space switch in accordance with the invention.

Referring now to FIG. 1, apparatus according to the present invention is there shown. The apparatus 100, referred to as a virtual circuit space switch, comprises a virtual circuit switch 110 and a space switch 112.

Virtual circuit switches are well-known. The virtual circuit switch 110 is preferably of the type disclosed in the aforementioned "Scalable Multimedia Network" application and functions to switch or connect virtual circuits between input ports LI and output ports LO1–LOm through switch network 130.

Virtual circuits are generally used for connection-oriented services. Virtual circuits eliminate the need for having to make routing decisions for each packet or cell sent. Rather, a route from the source to the destination is selected during the establishment of a connection. The route is then used for all data flowing over the connection. When the connection is released, the virtual circuit is also released and made available for new connections.

Since cells flowing over a given virtual circuit always take the same route through the network, the virtual circuit switch keeps track of where to forward cells for each virtual circuit by maintaining a table in memory with one entry per virtual circuit. Each cell contains a virtual circuit member, also called a Virtual Circuit Identifier (VCI) in the packet header information. (See Tanenbaum, A. S., *Computer Networks* Second Edition, Prentice Hall 1989, pp. 280–283).

The virtual circuit switch 110 includes a plurality of input ports LI and M output ports LO1–LOm. Message cells, such as Asynchronous Transfer Mode (ATM) cells, are transmitted over communication paths 114 to input ports LI. Communication paths 114 can be any type of transmission facilities such as a T1 facility or an optical transmission path such as a SONET OC-3 facility. Each message cell has a header and an information field. Data carried in the information field can be from any source and operate at any speed. Each message cell is assigned to a particular virtual circuit identified in the header with a VCI. Thus, the VCI associates each particular cell with a virtual circuit. A virtual path identifier (VPI) allows groups of virtual circuits to be handled as a single entity. As shown in FIG. 1, a virtual path 128 carries virtual circuits VC1–VC4 into the first input port LI.

A message cell arriving on virtual path 128 and assigned to a particular virtual circuit exits switch network 130 on the proper output port LO1–LOm as assigned by forwarding tables in virtual circuit switch 110 for the particular virtual circuit. As shown in FIG. 1, virtual circuits VC1 and VC2 are carried over the network 130 to the first output port LO1. Virtual circuits VC3 and VC4 are routed to output port LOm.

The space switch 112 includes M input ports RI1–RIm and N output ports RO1–ROn where M<<N. The space switch 112 includes a switching fabric matrix 132 for connecting any of the input ports RI1–RIm to one or more of the output ports RO1–ROn. The input ports RI1–RIm are coupled to respective output ports LO1–LOm of the virtual circuit switch 110. Functionally, the space switch 112 is operable to distribute message cells contained in virtual circuits received on the relatively few M input ports to the relatively many N output ports. Thus, virtual circuits VC1 and VC2 are distributed to output ports RO1 and ROj, where the signals are designated as VC1-a, VC2-a and VC1-b, VC2-b respectively. In this manner, a subscriber connected to output port RO1 and a subscriber connected to output port ROj can receive the same stream of message cells contained in the respective virtual circuits VC1, VC2. Virtual Circuits VC3 and VC4 are connected directly to output port ROn.

An advantage of the present invention is that the per subscriber port costs of the expensive VCS 110 are greatly reduced by the addition of the space switch 112. For example, as will be shown in the description of a preferred embodiment herein, to serve 480 subscribers with a VCS alone, would require 480 ports on the VCS. In contrast, the preferred embodiment of the present invention requires only 64 ports on the VCS and replaces the port costs with a much more economical space switch. This savings in downstream port costs is possible because of the asymmetric nature of the services.

Figure 2:
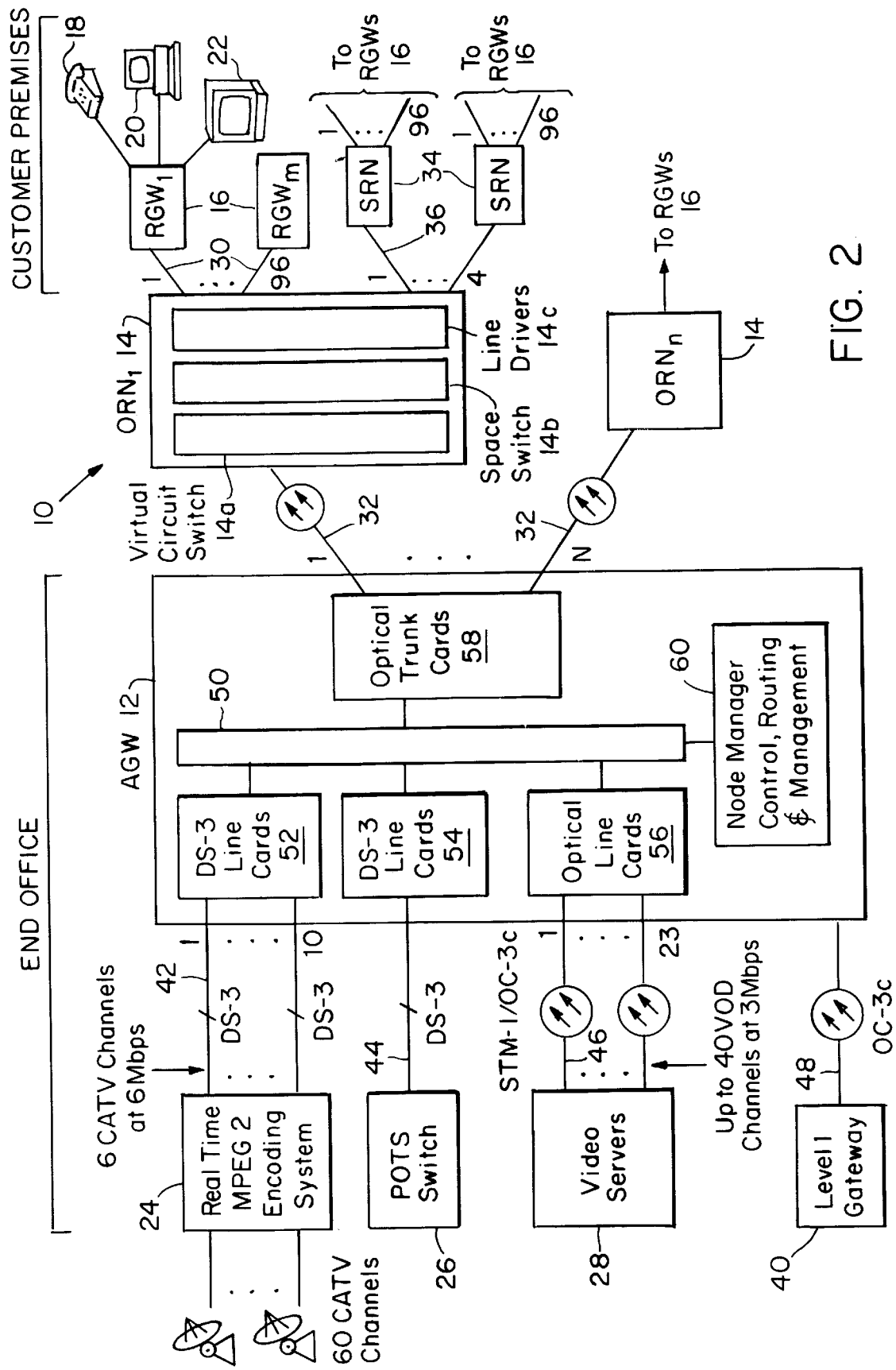
FIG. 2 is a block-diagram drawing of a multimedia communication system of the invention.

Referring now to FIG. 2, there is shown an advanced "Fiber-To-The-Curb" (FTTC) multimedia network 10 in accordance with the invention which comprises a plurality of optical remote nodes 14 (ORN$_1$- - - ORN$_n$) connected to a plurality of residential gateways 16 (RGW$_1$, - - - RGW$_m$) at the customer premises via existing or added copper wire pairs 30. Fiber-based broadband media 32, such as Synchronous optical Network (SONET) based Asynchronous Transfer Mode (ATM) transmission facilities, transports POTS and Multimedia service signals between the ORNs and an Access Gateway (AGW) 12 located in a service provider's end office. The AGW 12 provides multimedia access to backbone networks, including POTS, ATM, Frame Relay, and Public/Private Internet Protocol networks, as well as local and remote servers. More specifically, the AGW 12 provides ATM access to broadband video sources, including digital CATV and Video-On-Demand (VOD) MPEG 2 based signals provided by a real time MPEG2 encoding system 24 and video server 28.

The AGW 12 includes a "tier 2 bus" system as described in the aforesaid "Scalable Multimedia Network" application. The tier 2 bus 50 provides distributed switching connections for line interface cards 52, 54, 56, 58. DS-3 line card 52 terminates video signals received on DS-3 lines 42 from Real Time MPEG 2 Encoding System 24. DS-3 line card 54 terminates voice signals received on DS-3 lines 44 from POTS switch 26. Video signals received on SONET lines 46 from Video Server 28 terminate on optical line cards 56. The voice and video signals received from these sources are in the form of ATM cells that are switched as virtual circuits in the manner described in the aforesaid "Scalable Multimedia Network" application and coupled to optical trunk cards 58 for transmission to the ORNs 14. The AGW 12 also provides access to a level 1 Gateway 40 for managing video requests from subscribers as described hereinafter.

By "fiber to the curb" is meant an access network architecture in which fiber is brought to within a suitable distance to reach multiple subscribers over a connected drop network, typically copper based. The ORN 14 is typically located at the edge of a standard telephone company Distribution Area (DA) or, in the case of a high density of subscribers, in a building. The ORN 14 can also be located in the end office. In conjunction with loop technologies capable of providing full 1300 ohms wire center or 900 ohms Carrier Serving Area coverage, the ORN 14 then provides a cost effective evolutionary bridge to the full complement of broadband multimedia services.

The ORN 14 acts as a service concentrator, providing subscribers with switched access to the services provided through the backbone networks. The concentration provided by the switching functionality of the ORN 14, described further herein, provides economical access by enabling a large number of subscribers to share the costs of the expensive backbone-access network interfaces, local and remote servers, and fiber facilities from the end office to the building/curbside.

The ORN 14 includes a virtual circuit switch 14a, a space switch 14b, and line drivers 14c. The virtual circuit switch 14a comprises a "tier 1 bus" system as described in the aforementioned "Scalable Multimedia Network" application. The space switch 14b provides selection of downstream signals for distribution to subscribers at RGWs 16 as described further herein. The line drivers 14c couple signals to and from the RGWs 16 over media 30 using an appropriate loop technology such as Multimedia Over Voice (MOV). The ORN 14 can also extend the tier 1 bus system to Satellite Remote Nodes (SRNs) 34 over media 36 such as coax. The ORN 14 also feeds power to the SRN 34. The SRN 34 has similar functionality to the ORN 14 for delivering services to other RGWs 16. Together, the ORN 14 and subtending SRNs 34 can serve N subscribers, where N is preferably 500.

The conventional view would suggest that placing a broadband switching function such as provided by the ORN 14 in the DA is too far into the neighborhood to reach enough subscribers. However, the combination of subtending SRNs 34 and MOV loop technology, which provides 2 Kft reach, makes it possible to serve 500 subscribers.

The RGWs 16 act as the service hand-off point to the subscribers, separating out the voice, data and video signals on the respective channels of communication and feeding the separated signals to the appropriate voice 18, data 20 or video instruments 22 or sets at the customer premises.

In order for the FTTC network 10 of the invention to be properly implemented, an analysis of the services to be provided and the physical topology required to deliver the services is required. Table I below summarizes the individual services envisioned for the system and the bandwidth requirements for each. "Downstream" refers to signals which are transferred from the AGW 12 towards the RGWs 16. "Upstream" refers to signals which are transferred from the RGWs 16 towards the AGW 12. As can be seen, many of the services are highly asymmetrical in their bandwidth requirements, requiring much greater downstream bandwidth than upstream bandwidth.

TABLE I

Services and Associated Bandwidth Requirements

| Service | Downstream BW Per Session | Upstream BW Per Session |
|---|---|---|
| Broadcast Video | 6 Mbps | — |
| Video On Demand | 3 Mbps | 1 Kbps* |
| Telephony | 64 Kbps | 64 Kbps |
| Video Teleconferencing | 384 Kbps | 384 Kbps |
| Data Communications | PEAK > 1 Mbps | Peak > 0.1 Mbps |
|  | Average = 10 Kbps | Average = 10 Kbps |

*Assumption on Interactivity

Table II below shows the bandwidth requirement the copper drop will be expected to support for the service mix desired. From this table it is clear that a downstream channel operating at 20+ Mbps and an upstream channel operating at 600+ Kbps would be adequate to support this service mix. These channels must operate over lifeline POTS service to provide the full gamut of desired residential services.

TABLE II

Bandwidth Requirements on the Copper Drop for a Full Compliment of Residential Services

| Service | # of Simultaneous Sessions | Downstream Bandwidth | Upstream Bandwidth |
|---|---|---|---|
| CATV | 0–2 | 0–12 Mbps | — |
| VOD | 0–1 | 0–3 Mbps | 1 Kbps |
| Telephony | 0–1 | 0–64 Kbps | 64 Kbps |
| Video Teleconf. | 0–1 | 0–384 Kbps | 384 Kbps |
| Data Comm. | 0–1 | 0–(Peak > 1 Mbps Average = 1 Kbps) | 0–(Peak > 0.1 Mbps Average = 1 Kbps) |
| TOTAL | 0–6 | 0–16.448 Mbps | 0–549 Kbps |

Table III below provides a summary of the total bandwidth needed to be delivered through an ORN 14 which serves 500 subscribers with the service mix depicted in Table II. It is evident from this table that the broadband media 32 must be capable of supporting at least 800+ Mbps downstream and 52+ Mbps upstream from each ORN 14. These bandwidth requirements can be met with a well-known single SONET OC-48c link, or multiple OC-3c or OC-12c links, where OC-N refers to the standard SONET optical carrier line rates and the c refers to the concatenated format.

TABLE III

Total Bandwidth Needed for 500 Subscribers

| Service | Peak Demand | Active Simultaneous Sessions | Downstream Bandwidth | Upstream Bandwidth |
|---|---|---|---|---|
| CATV 100 channels | 100% | 500 | 600 Mbps | — |
| VOD | 10% | 50 | 150 Mbps | 0.5 Mbps |
| Telephony | 100% | 500 | 32 Mbps | 32 Mbps |
| Video Teleconf. | 10% | 50 | 19.2 Mbps | 19.2 Mbps |
| Data Com. | 10% | 50 | 0.5 Mbps | 0.05 Mbps |
| TOTAL |  |  | 801.7 Mbps | 51.75 Mbps |

Based upon the bandwidth analysis in Tables I, II and III, it may be seen that a Multimedia-Over-Voice (MOV) copper loop needs to have the ability to transport:

I. Life-line POTS signals;

II. 20+ Mbps downstream signals; and

III. 600+ Kbps upstream signals simultaneously between the ORN 14 and the RGW 16. Such a MOV loop is described in copending U.S. Patent Application entitled "Multimedia Over Voice Communication System" filed concurrently herewith (Attorney Docket No. INC96-03) which is incorporated herein in its entirety by reference.

Figure 3:
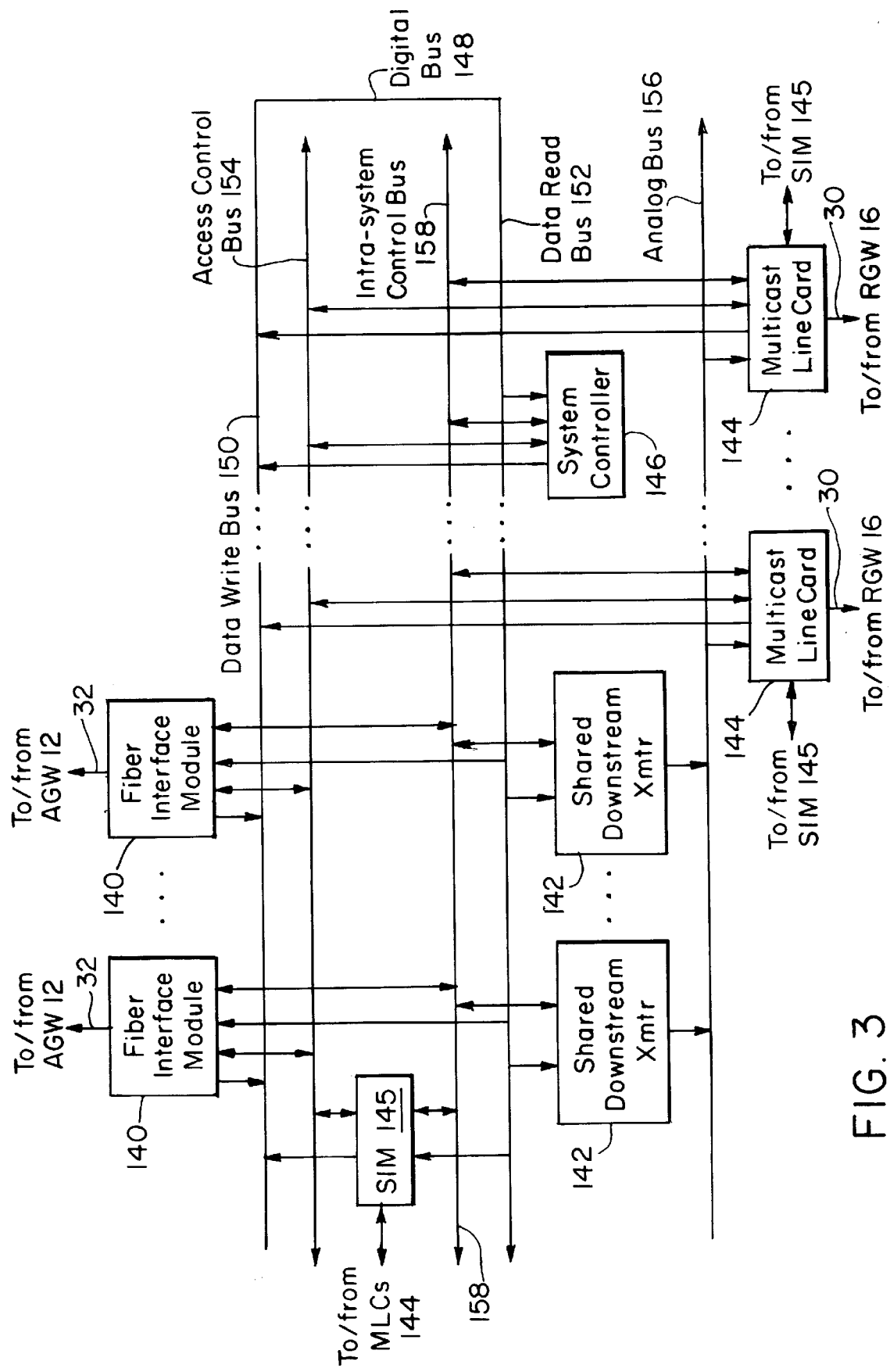
FIG. 3 is a schematic circuit block diagram of a preferred optical remote node (ORN) embodiment of the invention.

Referring now to FIG. 3, there is shown a system block diagram of the ORN 14 in accordance with the present invention comprising a plurality of Fiber Interface Modules (FIMs) 140, Shared Downstream Transmitter Modules (SDTMs) 142, Multicast Line Cards (MLCs) 144, each of which will be described in detail in connection with FIGS. 4–7. The ORN 14 also includes a Service Interface Module (SIM) 145 described herein and PowerPC based System Controller 146.

Three types of buses are used for communication and control. A Digital Bus 148 comprises a Data Write Bus 150 in one direction which is looped around to become a Data Read Bus 152 in the opposite direction. In conjunction with an Access Control Bus 154, the digital bus 148, also referred to as a Tier 1 bus, provides broadcast switching functions as described for the tiered bus system of the aforementioned "Scalable Multimedia Networks" patent application. An Analog Bus 156 makes available to the Multicast Line Cards 144 signals received from the Shared Downstream Transmitter Modules. The Analog Bus 156 comprises 64 parallel lines, each line for transporting an individual Quadrature Amplitude Modulation (QAM) coded signal, as described herein. Finally, an Intra-System Control Bus 158 is used for control among the system elements.

Downstream signals formatted as ATM cells are received from the AGW 12 at FIMs 140 over optical media 32. The FIMs 14 send the ATM cells to the SDTMs 142 over the Digital Bus 148. The SDTMs 142 combine downstream signals onto the Analog Bus 156 in an analog signal format. The Multicast Line Cards 144 transport the downstream signals received from the Analog Bus 156 together with narrowband services to subscribers at RGWs 16. In the upstream direction, upstream signals are received from RGWs 16 at the MLCs 144. The MLCs 144 send the upstream signals over the Digital Bus 148 as ATM cells to the FIMs 140. The FIMs 140 transmit the upstream signals to the AGW 12 over optical media 32.

To provide integrated services, a Service Interface Module (SIM) 145 is connected to the ORN. The function of the SIM is to provide both transmission and control signals for the subscribers to directly support narrowband services. Towards the subscriber, the SIM 145 interfaces with the Multicast Line Cards 144 through a narrowband drop interface described herein. Both broadband and narrowband services are integrated into the same MOV link by the MLCs 144.

Towards the network, data for narrowband services are multiplexed into an ATM-based high-speed trunk interface towards the ORN digital bus 148. In the user-to-network direction, voice traffic is digitized and multiplexed into an ATM stream using AAL1 Synchronous Date Transfer (SDT) format. The ATM stream is sent to the Data Write Bus 150. The ORN then combines both broadband and narrowband services into one ATM-based fiber interface. In the network-to-user direction, voice traffic is carried by virtual circuits in the ATM stream. The ORN terminates the ATM stream, extracts the POTS services, and performs an AAL1 function thereon. The digital stream is then converted to appropriate analog signals and sent to the subscribers through the loop interfaces.

Figure 4:
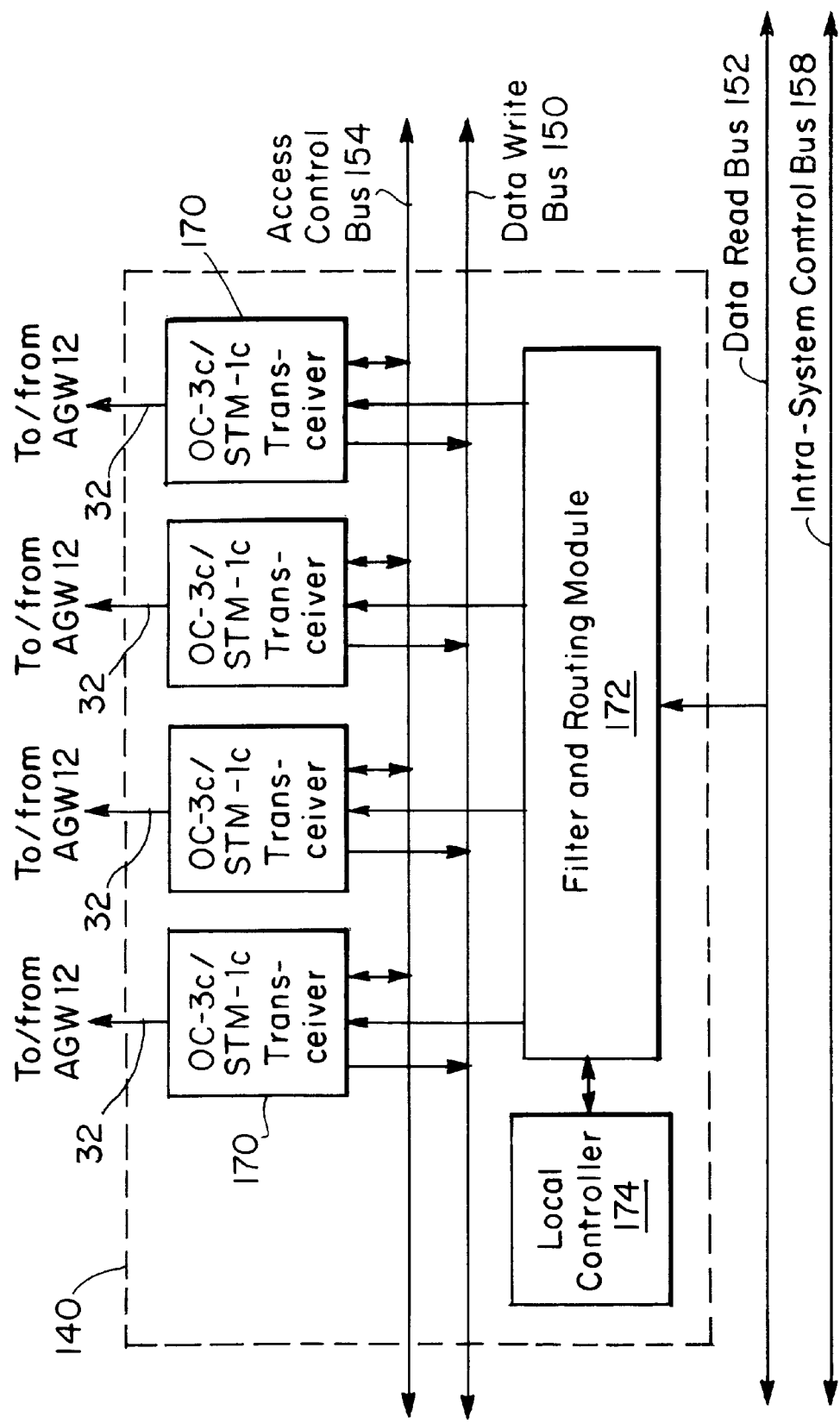
FIG. 4 is a schematic block diagram of the Fiber Interface Module of the ORN of FIG. 3.

The Fiber Interface Module 140 is shown in FIG. 4. The FIM 140 includes up to four optical transceivers 170 which communicate over optical media 32 to and from the AGW 12. The optical transceivers 170 receive from the AGW 12 downstream signals formatted as ATM cells contained in multiple virtual circuits. Note that optical media 32 can comprise multiple fibers to accommodate the number of optical transceivers 170. The signals are transmitted on the Data Write Bus 150 as ATM cells. The FIM 140 may comprise a quad SONET STM-1c/OC-3c module as shown having a total throughput of STM-4c/OC-12c. The optical transceivers 170 can be, for example, LIMO line interface modules provided by Odetics, Inc. Those skilled in the art can appreciate that the preferred embodiment could be adapted to accommodate higher rates to meet higher service requirements. The FIM also includes a Filter and Routing Module (FARM) 172 for upstream data capabilities. The FARM 172 performs a filtering and routing function on upstream ATM cells received on the Data Read Bus 152. The FARM 172 filters ATM cells intended for the FIM 140. The filtered ATM cells are then placed in queues for output directly to the OC-3c transceivers 170. A Motorola 68360 CPU serves as a local controller 174 for the FIM 140.

Figure 5:
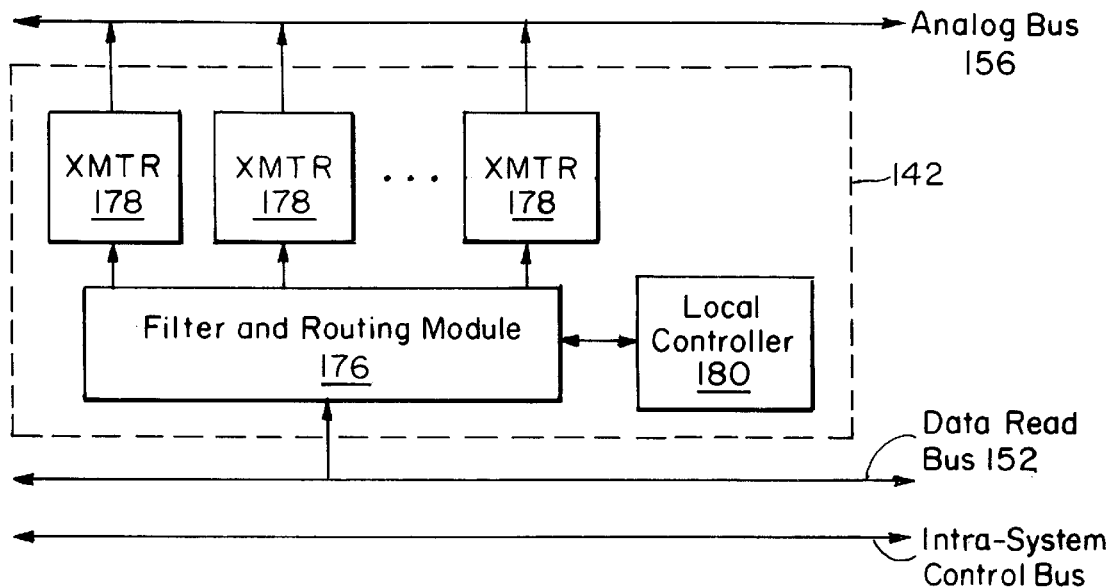
FIG. 5 is a schematic block diagram of the Shared Downstream Transmitter Module of the ORN of FIG. 3.

The Shared Downstream Transmitters Module 142 is shown in FIG. 5. The SDTM 142 includes a Filter and Routing Module (FARM) 176 which receives from the Data Read Bus 152 incoming ATM cells from software programmed Virtual Circuit Identifiers (VCIs) and performs a filtering function. These ATM cells were placed on the Data Write Bus 150 by the FIM 40 described above. The cells are then routed to different associated outgoing shared transmitters 178. This routing is controlled by software programmed routing tables in the module 176. The transmitters 178 include coders/modulators associated with the loop technology, such as MOV, as described in the aforementioned "Multimedia Over Voice Communication System" patent application. The coded/modulated signals, which in the case of MOV are preferably 16-level QAM coded signals comprising up to three 6 Mbps digital video signals and multiple data signals for each transmitter, are placed on the Analog Bus 156 for distribution to the Multicast Line Cards 144. Thus, each QAM signal is approximately 20 Mbps. A 68360 CPU 180 serves as a local controller in the SDTM 142.

Figure 6:
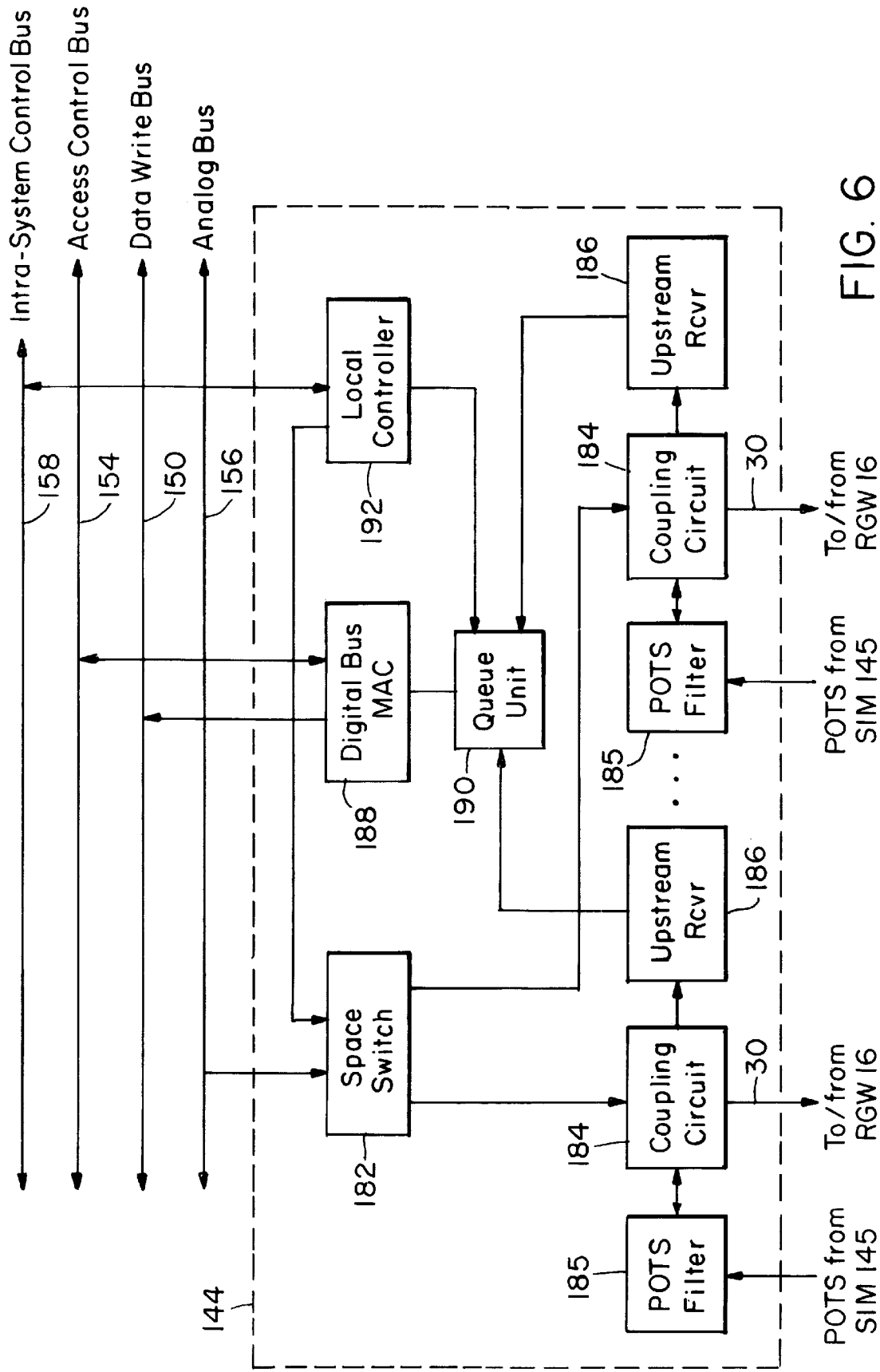
FIG. 6 is a schematic block diagram of the Multicast Line Card of the ORN of FIG. 3.

Referring now to FIG. 6, a Multicast Line Card 144 is shown. A space switch 182, described further herein, under software control multicasts the signals received from the SDTMs 142 on Analog Bus 156 to a plurality of coupling circuits 184 for transport to the subscriber RGWs 16. The coupling circuit 184 is as described in the aforementioned "Multimedia Over Voice" patent application. Software ensures that the target VCIs are contained in the correct output signals to satisfy the service desires of the receiving subscribers. The POTS Filter 185 connects POTS services received on separate media from the SIM 145 to the coupling circuit 184 for transmission over the loop.

The MLC 144 includes upstream receivers 186 for receiving return data signals on a per subscriber basis. The upstream receivers use Frequency Shift Keying (FSK) or Quadrature Phase Shift Keying (QPSK) modulation depending on the loop technology deployed. A Media Access Controller (MAC) 188 connects these incoming return signals to the Data Write Bus 150 with proper contention on the Access Control Bus 154. A Queue Unit 190 filters return signals and queues them for the MAC 188 and filters messages destined for a local controller 192 and delivers them to the controller's queue. The MAC 188 is functionally equivalent to the Bus Interface Chip (BIC) described in the aforesaid "Scalable Multimedia Network" patent application.

The space switching functionality essentially provides a broadcast media architecture. The space switching functionality provides an economical way for distributing broadcast services to the 500 subscribers by sharing a smaller number (64) of QAM signals. The per subscriber cost of the space switch is equivalent to a coaxial cable tap. The same QAM signal is shared by multiple users. As noted above, each QAM signal can include up to 3 compressed video signals and multiple data signals that can be dropped off to individual subscribers.

Figure 7:
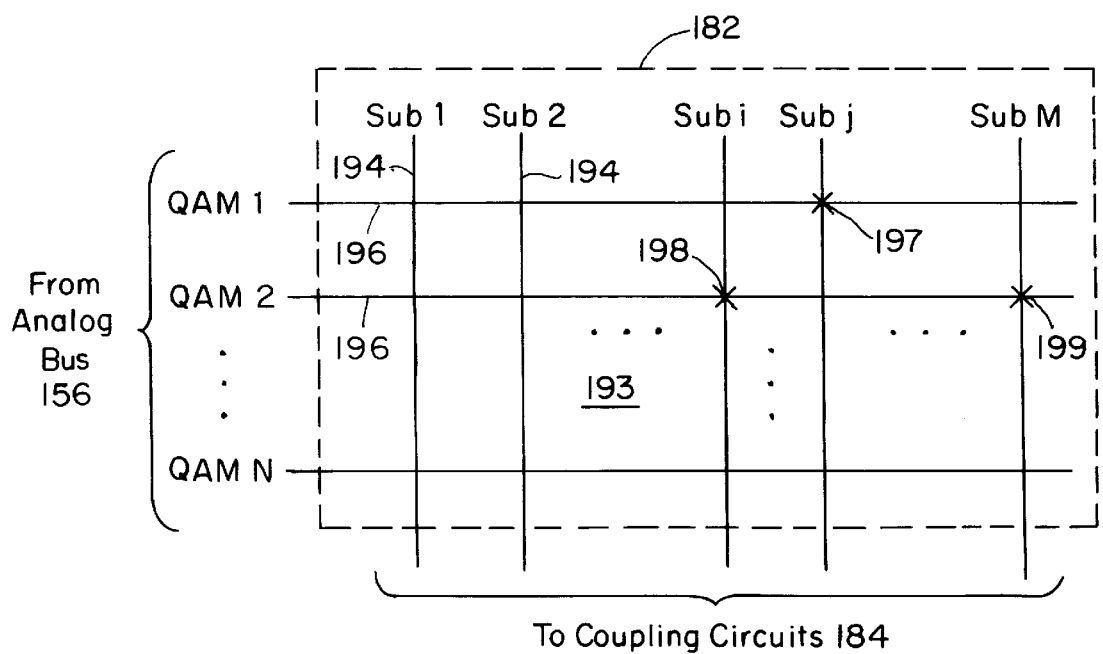
FIG. 7 is a schematic block diagram of the Space Switch of the Multicast Line Card of FIG. 6.

Referring to FIG. 7, a space switch 182 present in each Multicast Line Card 144 is there shown. Thus, the space switch function 14c (FIG. 1) is distributed across space switches 182 located in the MLCs 144. The space switch 182 functions as a distribution switch for the N QAM signals (where in the preferred embodiment N=64) output from the Analog Bus 156. A switch matrix 193 provides for crosspoint connections between any QAM signal 1–N and any subscriber 1–M served by the particular Multicast Line Card 144. The switch matrix 193 can be, for example, a MAX456 video switch matrix provided by Maxim. For example, crosspoint 198 is closed to connect QAM signal 2 to subscriber i and crosspoint 197 is closed to connect signal 1 to subscriber j. Multiple subscribers may be connected to the same QAM signal, as shown by the crosspoint 199 closed to connect subscriber M to QAM signal 2 also.

Having thus described a particular embodiment of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A communication system for transmitting video signals to subscribers comprising:
   a source of video signals; and
   a switch having:
   a digital communication bus;
   a first interface unit coupled to the source for coupling the video signals onto the digital communication bus;
   an analog communication bus;
   a transmitter coupled to the digital communication bus for amplitude modulating a carrier signal with the video signals and transmitting the AM signals onto the analog communication bus; and
   a plurality of second interface units coupled to the analog communication bus, each second interface unit operable to transmit a subset of the AM signals requested by associated subscribers.

2. The system of claim 1 further comprising a communication link coupled between the source and the switch.

3. The system of claim 1 wherein the source is an access gateway coupled to at least one backbone network.

4. The system of claim 1 further comprising a plurality of residential gateway devices, each gateway device coupled to a one of the second interface units over a copper communication link and operable to receive at least one of the signals in the associated subset of AM signals.

5. The system of claim 1 wherein the video signals are provided as Asynchronous Transfer Mode cells.

6. The system of claim 1 wherein the transmitter converts video signals into a Quadrature Amplitude Modulation signal.

7. The system of claim 1 wherein each second interface unit further comprises a space switch coupled to the analog bus for selecting from among the AM signals the requested subset of AM signals.

8. A data communication switch for selecting video signals for transmission to subscribers, comprising:
   a digital communication bus;
   a first interface unit for receiving the video signals and coupling the video signals to the digital communication bus;
   an analog communication bus;
   a transmitter coupled to the digital communication bus for amplitude modulating a carrier signal with the video signals and transmitting the AM signals onto the analog communication bus; and
   a plurality of second interface units coupled to the analog communication bus, each second interface unit operable to transmit a subset of AM signals requested by associated subscribers.

9. The switch of claim 8 wherein the video signals are provided by an access gateway coupled to at least one backbone network.

10. The switch of claim 9 wherein the video signals are provided as Asynchronous Transfer Mode cells.

11. The switch of claim 8 wherein the transmitter converts a set of three video data signals into a Quadrature Amplitude Modulation signal.

12. The switch of claim 8 wherein each second interface unit further comprises a space switch coupled to the analog bus for selecting from among the AM signals the requested subset of AM signals.

13. A method of communication comprising:
    providing a source of video signals;
    coupling the video signals onto a digital communication bus;
    amplitude modulating a carrier signal with the video signals from the digital communication bus and coupling the AM signals onto an analog communication bus; and
    transmitting a subset of the AM signals to a subscriber responsive to a subscriber request.

14. The method of claim 13 further comprising the step of coupling the subset of AM signals over a copper communication link to the subscriber.

15. The method of claim 13 wherein the video signals are provided as Asynchronous Transfer Mode cells.

16. The method of claim 13 wherein the amplitude modulation is Quadrature Amplitude Modulation.

17. In an ATM network, a method of communication comprising the steps of:
    receiving a digital signal comprising message cells on a first input port of a virtual circuit switch, the message cells having a virtual circuit identifier associated with a particular first output port;
    routing the message cells to the associated first output port;
    coupling message cells on the first output port to a second input port of a space switch; and
    distributing the message cells to at least one second output port wherein the step of coupling includes converting the digital signal to an amplitude modulated signal.

18. The method of claim 17 wherein the amplitude modulated signal is a Quadrature Amplitude Modulated signal.

* * * * *